(No Model.)

J. B. SNYDER.
MACHINE FOR BUILDING PICKET FENCES.

No. 325,574. Patented Sept. 1, 1885.

WITNESSES
INVENTOR
Attorneys

United States Patent Office.

JAMES B. SNYDER, OF BEDFORD, IOWA.

MACHINE FOR BUILDING PICKET FENCES.

SPECIFICATION forming part of Letters Patent No. 325,574, dated September 1, 1885.

Application filed July 8, 1885. (No model.)

*To all whom it may concern:*

Be it known that I, JAMES B. SNYDER, a citizen of the United States, residing at Bedford, in the county of Taylor and State of Iowa, have invented a new and useful Machine for Building Picket Fences, of which the following is a full, clear, and exact description, reference being had to the accompanying drawings, forming part of this specification, in which—

Figure 1:
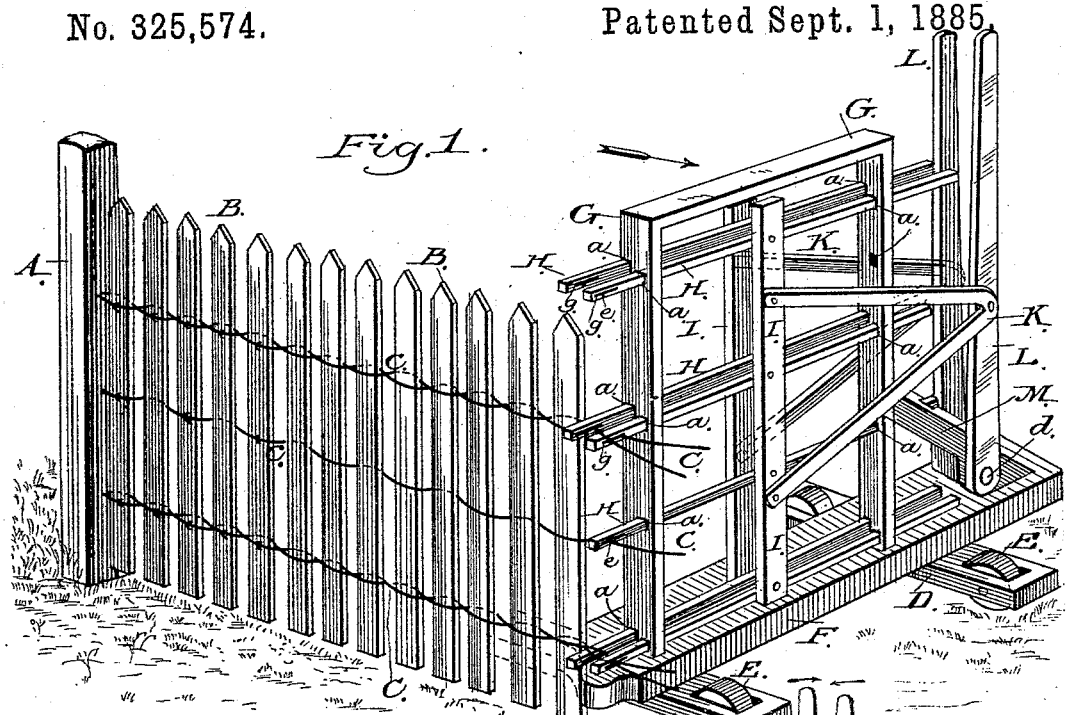
Figure 2:
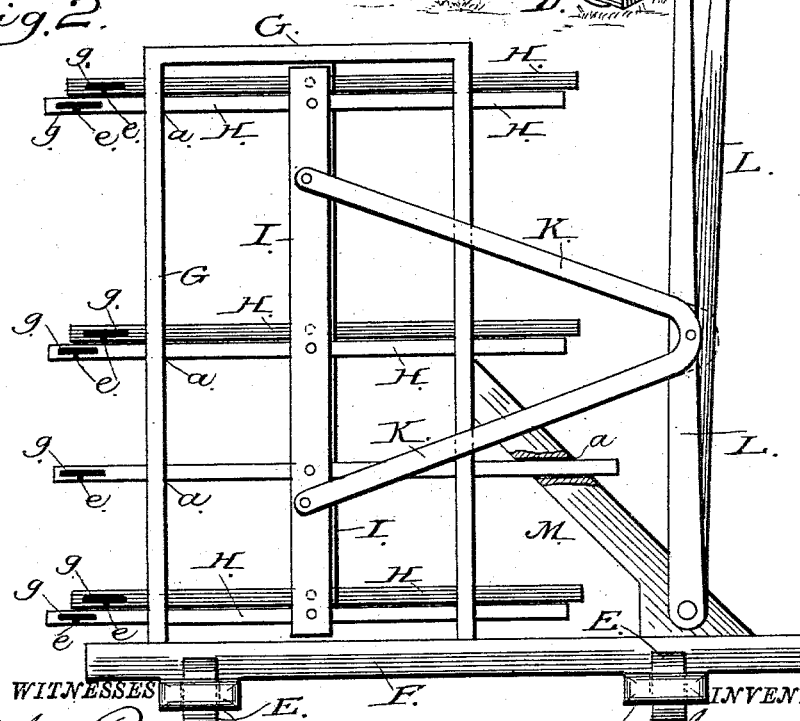

Figure 1 represents a perspective view illustrating the manner in which my machine is used, and showing a section of the fence nearly completed. Fig. 2 represents a side view of my machine.

My invention relates to machines for building picket fences; and it consists, essentially, in a machine provided with a double series of oppositely-sliding arms provided with slots for the wire, and in levers attached to the arms, whereby the fence-wires are caused to interlace the panels.

It further consists in the construction, arrangement, and combination of devices, all of which will be hereinafter fully described and claimed.

To enable others skilled in the art to which my invention appertains to make and use the same, I will now proceed to describe its operation and the manner in which I have carried it out.

In the said drawings, A represents a fence-post B, the pickets, and C the wires, all of ordinary construction, but which I show to better illustrate the operation of my machine.

The machine by which the pickets are secured and the fence built is placed at right angles to the line of fencing, and is mounted upon trucks placed at each end, and which consist of frames D and supporting-wheels E, as shown. A longitudinal base-timber, F, rests upon the trucks and supports the frame and various working parts of my machine.

Projecting from the base-timber F is a vertical frame, G, which has a double series of openings, $a$, through which pass and freely slide the parallel longitudinally and oppositely moving arms H, the front ends of which are slotted at $e$ and $g$, to receive the wires C and cause said wires to interlace the pickets, in a manner which I shall hereinafter fully describe. These sliding arms H are securely fastened to vertical posts I, and these posts are in turn attached to the operating-levers L by means of >-shaped connecting-arms K, which are attached to the levers near their center, the said levers being fulcrumed upon a bolt, $d$, passing transversely through a brace, M, which is also provided with openings for the sliding arms H, similar to those made in the frame G, and this brace, being rigidly secured to the base-timber F and the rear post of the frame G, makes a firm support for the working parts of the machine.

In the practical operation of my machine I first plant a post, the same as for any other fence, and brace it in the usual manner. I then fasten the ends of the wires to this post, and run these wires to another post at a desired distance from the place of beginning, or at the end of the land to be fenced, and secure the wires at this point also by giving them one turn around the post. The machine is then drawn near the first post, and the wires arranged so as to be in line with the slots in the front ends of the sliding arms H, the wires being passed through the slots $e$ into the openings $g$, so that they may have a free movement and yet be prevented from becoming disengaged from the arms H. A picket is now inserted between the wires, and the levers L are moved in opposite directions, so that one set of sliding arms will draw one series of wires toward the machine, while the other set will force the remaining wires from the machine, thereby causing these wires to interlace the pickets and securely hold them. When the picket is thus secured, the machine is moved in place for the next picket, and this operation is continued until the fence is completed. This manner of interlacing takes up all the slack in the wires and makes the fence very secure. If, however, at any time during the building of the fence the strain upon the wires is too great, I unloose the ends which are temporarily secured at the end of the field, and allow the wires a little slack. When the pickets of a section have been secured as above described, I then may make them additionally secure by inserting staples upon each side of the picket.

I have shown in the drawings a fence having three sets of wires; but I do not confine myself to this number, as the same may be increased or diminished without departing from the spirit of my invention.

Having thus described my invention, what I claim as new, and desire to secure by Letters Patent, is—

1. The combination, with the frame G, having the openings a, of the double series of parallel oppositely-moving arms H, provided with slots e and g, the posts I, to which the arms are attached, and the levers for moving the said arms, substantially as herein described.

2. The combination of the frame G, the oppositely-moving arms moving within and guided by the frame, and provided with the slots e and g, the base-timber F, the transversely-placed wheeled trucks, the levers L, moving in opposite directions, the connecting-arms, and the sliding posts I, to which the arms H are connected, substantially as herein described.

JAMES B. SNYDER.

Witnesses:
JACOB THOMAS,
J. H. SNYDER.